US010063096B2

(12) United States Patent
Rejman et al.

(10) Patent No.: US 10,063,096 B2
(45) Date of Patent: Aug. 28, 2018

(54) SYSTEM HAVING A HAND TOOL CASE, LATENT HEAT STORAGE UNIT, AND A HAND TOOL BATTERY PROVIDED FOR INDUCTIVE CHARGING (71) Applicant: Robert Bosch GmbH, Stuttgart (DE)

(72) Inventors: Marcin Rejman, Waiblingen (DE); Juergen Mack, Goeppingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 42 days.

(21) Appl. No.: 14/359,783

(22) PCT Filed: Nov. 7, 2012

(86) PCT No.: PCT/EP2012/072020
§ 371 (c)(1),
(2) Date: May 21, 2014

(87) PCT Pub. No.: WO2013/075944
PCT Pub. Date: May 30, 2013

(65) Prior Publication Data
US 2014/0327396 A1 Nov. 6, 2014

(30) Foreign Application Priority Data

Nov. 22, 2011 (DE) .......................... 10 2011 086 799

(51) Int. Cl.
*B25H 3/00* (2006.01)
*B25H 3/02* (2006.01)
(Continued)

(52) U.S. Cl.
CPC .............. *H02J 50/10* (2016.02); *B25H 3/006* (2013.01); *B25H 3/02* (2013.01); *H01M 10/44* (2013.01);
(Continued)

(58) Field of Classification Search
CPC ...... H04B 5/00; B60L 11/182; B60L 11/1829; B60L 11/1831; H02J 7/025; H02J 17/00;
(Continued)

(56) References Cited

U.S. PATENT DOCUMENTS 3,892,197 A * 7/1975 Kinney .................. D06B 23/10
118/429
3,974,658 A * 8/1976 Starrett .................. B65D 25/02
62/60
(Continued)

FOREIGN PATENT DOCUMENTS

CN 1317161 A 10/2001
CN 2458741 Y 11/2001
(Continued)

OTHER PUBLICATIONS

"Thermalright True Black 120 CPU Cooler Review," Lee Garbutt, PC Perspective, Published Jul. 28, 2008, Accessed Apr. 6, 2017, www.pcper.com/reviews/Cases-and-Cooling/Thermalright-True-Black-120-CPU-Cooler-Review?aid=593.*
(Continued)

*Primary Examiner* — Robert Grant
*Assistant Examiner* — John Trischler
(74) *Attorney, Agent, or Firm* — Norton Rose Fulbright US LLP; Gerard Messina (57) ABSTRACT A system having a hand tool battery, a hand tool case which has at least one inductive charge receiving area which is provided for storing a hand tool battery which is inserted into the inductive charge receiving area at least partially in close proximity to at least one wall of the hand tool case, and having at least one latent heat storage unit which is provided for influencing at least a temperature of the at least one hand tool battery.

26 Claims, 5 Drawing Sheets (51) Int. Cl.
*H02J 50/10* (2016.01)
*H01M 10/44* (2006.01)
*H01M 10/46* (2006.01)
*H01M 10/60* (2014.01)
*H01M 10/6235* (2014.01)
*H01M 10/659* (2014.01)
*H01M 2/10* (2006.01)
*H02J 7/00* (2006.01)

(52) U.S. Cl.
CPC ............ *H01M 10/46* (2013.01); *H01M 10/60* (2015.04); *H01M 10/6235* (2015.04); *H01M 10/659* (2015.04); *H01M 2/1022* (2013.01); *H02J 7/0052* (2013.01)

(58) Field of Classification Search
CPC ........ H02J 5/005; Y02T 90/122; H01F 38/14; F28D 20/02; F28D 20/021; F28D 20/023; F28D 20/025
USPC ........ 320/108; 307/104; 165/104.18, 104.15, 165/104.13
See application file for complete search history.

(56) References Cited

U.S. PATENT DOCUMENTS

| | | | | |
|---|---|---|---|---|
| RE29,073 E * | 12/1976 | Kinney | ............ | G01N 1/31 118/429 |
| 4,259,198 A * | 3/1981 | Kreibich | ............ | C08L 63/00 126/400 |
| 4,393,817 A * | 7/1983 | Lindberg | ............ | F02B 43/08 123/25 E |
| 4,883,726 A * | 11/1989 | Peled | ............ | H01M 10/613 429/120 |
| 5,158,841 A * | 10/1992 | Mennicke | ............ | H01M 10/3909 220/592.2 |
| 5,199,565 A * | 4/1993 | Voroba | ............ | B65D 83/0454 206/704 |
| 5,343,368 A * | 8/1994 | Miller | ............ | F21L 4/08 165/902 |
| 5,423,122 A * | 6/1995 | Boltz | ............ | B23P 15/26 29/890.032 |
| 6,220,337 B1 * | 4/2001 | Chen | ............ | F28D 15/0266 165/10 |
| 6,267,045 B1 * | 7/2001 | Wiedemann | ............ | F24C 15/327 219/386 |
| 6,300,695 B1 * | 10/2001 | Neal | ............ | H02K 5/1735 310/64 |
| 6,362,554 B1 * | 3/2002 | Neal | ............ | G11B 19/2009 264/272.2 |
| 6,437,464 B1 * | 8/2002 | Neal | ............ | G11B 19/2009 310/254.1 |
| 6,501,616 B1 * | 12/2002 | Neal | ............ | G11B 19/2009 360/99.08 |
| 6,586,912 B1 * | 7/2003 | Tsukamoto | ............ | H01M 10/647 320/150 |
| 6,617,721 B1 * | 9/2003 | Neal | ............ | G11B 19/2009 310/254.1 |
| 6,753,628 B1 * | 6/2004 | Neal | ............ | G11B 19/2009 29/598 |
| 6,761,994 B2 * | 7/2004 | Yamashita | ............ | B32B 7/12 156/334 |
| 6,891,353 B2 * | 5/2005 | Tsukamoto | ............ | H01M 10/44 320/136 |
| 6,894,456 B2 * | 5/2005 | Tsukamoto | ............ | A61N 1/3787 320/107 |
| 6,911,166 B2 * | 6/2005 | Neal | ............ | B29C 45/77 264/272.14 |
| 6,941,640 B2 * | 9/2005 | Neal | ............ | G11B 5/102 198/867.01 |
| 7,009,362 B2 * | 3/2006 | Tsukamoto | ............ | A61N 1/3787 320/107 |
| 7,049,715 B2 * | 5/2006 | Neal | ............ | G11B 19/2009 29/596 |
| 7,140,508 B2 * | 11/2006 | Kuhn | ............ | B65D 81/1275 220/592.26 |
| 7,147,071 B2 * | 12/2006 | Gering | ............ | B60H 1/00278 165/164 |
| 7,154,200 B2 * | 12/2006 | Neal | ............ | G11B 19/2009 310/43 |
| 7,190,548 B2 * | 3/2007 | Neal | ............ | G11B 5/102 360/97.19 |
| 7,270,910 B2 * | 9/2007 | Yahnker | ............ | B25F 5/008 30/500 |
| 7,368,196 B2 * | 5/2008 | Wexel | ............ | H01M 8/04014 429/441 |
| 7,443,136 B2 * | 10/2008 | Tsukamoto | ............ | H01M 10/623 320/112 |
| 7,486,048 B2 * | 2/2009 | Tsukamoto | ............ | A61N 1/3787 320/112 |
| 7,492,124 B2 * | 2/2009 | Johnson | ............ | B25F 5/02 320/107 |
| 7,589,500 B2 * | 9/2009 | Johnson | ............ | B25F 5/00 320/114 |
| 7,592,776 B2 * | 9/2009 | Tsukamoto | ............ | H01M 10/44 320/136 |
| 7,893,659 B2 * | 2/2011 | Tsukamoto | ............ | H01M 10/623 320/150 |
| 7,908,870 B2 * | 3/2011 | Williams | ............ | F25D 3/08 62/530 |
| 7,952,326 B2 * | 5/2011 | Johnson | ............ | B25F 5/02 320/114 |
| 7,972,738 B2 * | 7/2011 | Yamamiya | ............ | H01M 8/04014 429/433 |
| 8,082,041 B1 * | 12/2011 | Radziemski | ............ | A61N 1/3787 607/33 |
| 8,168,338 B2 * | 5/2012 | Yamamiya | ............ | H01M 8/04007 348/207.99 |
| 8,182,935 B2 * | 5/2012 | Alkemade | ............ | H01M 10/625 429/120 |
| 8,579,113 B2 * | 11/2013 | Baumgartner | ............ | B25H 3/006 206/349 |
| 8,603,694 B2 * | 12/2013 | Cremers | ............ | H01M 8/04014 429/433 |
| 8,607,581 B2 * | 12/2013 | Williams | ............ | F25D 3/08 62/530 |
| 8,822,067 B2 * | 9/2014 | Johnson | ............ | B25F 5/00 429/149 |
| 8,887,619 B2 * | 11/2014 | Kallmyer | ............ | A61N 1/3787 92/56 |
| 9,521,223 B1 * | 12/2016 | Rajagopalan | ............ | H04M 1/0262 |
| 9,537,344 B2 * | 1/2017 | Thompson | ............ | H02J 7/025 |
| 9,560,787 B2 * | 1/2017 | Kallmyer | ............ | A61N 1/3787 |
| 9,583,803 B2 * | 2/2017 | Miller | ............ | H02J 5/005 |
| 2002/0119357 A1 * | 8/2002 | Baldauf | ............ | H01M 8/04 429/410 |
| 2003/0085684 A1 * | 5/2003 | Tsukamoto | ............ | A61N 1/3787 320/108 |
| 2004/0004464 A1 * | 1/2004 | Tsukamoto | ............ | H01M 10/44 320/162 |
| 2004/0058215 A1 * | 3/2004 | Bruck | ............ | B60K 1/04 429/410 |
| 2004/0060523 A1 * | 4/2004 | Wetzel | ............ | B60H 1/00428 123/3 |
| 2004/0076862 A1 * | 4/2004 | Bruck | ............ | H01M 8/04007 429/435 |
| 2004/0106963 A1 * | 6/2004 | Tsukamoto | ............ | A61N 1/3787 607/33 |
| 2004/0124112 A1 * | 7/2004 | Kuhn | ............ | B65D 81/1275 206/521 |
| 2004/0209135 A1 * | 10/2004 | Wexel | ............ | H01M 8/04014 429/441 |
| 2005/0021100 A1 * | 1/2005 | Tsukamoto | ............ | A61N 1/3787 607/29 |
| 2005/0023907 A1 * | 2/2005 | Neal | ............ | G11B 19/2009 310/43 |
| 2005/0029990 A1 * | 2/2005 | Tsukamoto | ............ | H01M 10/44 320/135 |

(56) References Cited

U.S. PATENT DOCUMENTS

| | | | | |
|---|---|---|---|---|
| 2005/0202310 A1* | 9/2005 | Yahnker | ............... | B25F 5/008 429/62 |
| 2006/0156756 A1* | 7/2006 | Becke | ............... | A47G 19/2288 62/457.3 |
| 2007/0096686 A1* | 5/2007 | Jimenez | ............... | H02J 50/10 320/108 |
| 2007/0103121 A1* | 5/2007 | Johnson | ............... | B25F 5/02 320/134 |
| 2007/0128505 A9* | 6/2007 | Yahnker | ............... | B25F 5/008 429/62 |
| 2008/0003491 A1* | 1/2008 | Yahnker | ............... | B25F 5/008 429/62 |
| 2008/0014482 A1* | 1/2008 | Yamamiya | ......... | H01M 8/04007 429/421 |
| 2008/0035507 A1* | 2/2008 | Collister | ............. | B25H 3/006 206/349 |
| 2008/0061734 A1* | 3/2008 | Roehm | ............... | B25F 5/02 320/108 |
| 2008/0142377 A1* | 6/2008 | Suzuki | ............... | F17C 11/005 206/0.7 |
| 2008/0176115 A1* | 7/2008 | Yamamiya | ......... | H01M 8/04014 429/421 |
| 2008/0286615 A1* | 11/2008 | Cremers | ............ | H01M 8/04014 429/486 |
| 2009/0039088 A1* | 2/2009 | Williams | ............. | F25D 3/08 220/592.26 |
| 2009/0123815 A1* | 5/2009 | Alkemade | ........... | H01M 10/625 429/50 |
| 2009/0212737 A1* | 8/2009 | Johnson | ............. | A47B 96/02 320/108 |
| 2009/0212743 A1* | 8/2009 | Hagiwara | ............ | C07C 311/48 320/137 |
| 2009/0250364 A1* | 10/2009 | Gerold | ............... | B25H 3/006 206/349 |
| 2010/0167110 A1* | 7/2010 | Johnson | ............. | B25F 5/00 429/91 |
| 2010/0248058 A1* | 9/2010 | Suzuki | ............. | H01M 8/04052 429/442 |
| 2011/0005951 A1* | 1/2011 | Baumgartner | ........ | B25H 3/006 206/349 |
| 2011/0024150 A1* | 2/2011 | Subramaniam | ......... | H02G 5/10 174/15.1 |
| 2011/0168727 A1* | 7/2011 | Williams | ............. | F25D 3/08 220/592.26 |
| 2011/0203947 A1* | 8/2011 | Ogawa | ............... | F02M 25/089 206/216 |
| 2012/0068668 A1* | 3/2012 | Kittell | ............... | B60L 11/185 320/162 |
| 2012/0189893 A1* | 7/2012 | Lachenmeier | .......... | B60L 1/003 429/120 |
| 2013/0105115 A1* | 5/2013 | Kallmyer | ............ | A61N 1/3787 165/76 |
| 2013/0106347 A1* | 5/2013 | Kallmyer | ............ | A61N 1/3787 320/108 |
| 2013/0175984 A1* | 7/2013 | Yamazaki | ............ | H04B 5/0037 320/108 |
| 2013/0207596 A1* | 8/2013 | Zichner | ............. | H01M 2/024 320/107 |
| 2013/0216867 A1* | 8/2013 | Schaefer | ............ | H01M 2/024 429/7 |
| 2013/0224527 A1* | 8/2013 | Johnson | ............. | B25F 5/00 429/7 |
| 2013/0224528 A1* | 8/2013 | Johnson | ............. | B25F 5/00 429/7 |
| 2013/0244070 A1* | 9/2013 | Johnson | ............. | B25F 5/00 429/91 |
| 2013/0306124 A1* | 11/2013 | Yajima | ............... | H01L 35/32 136/205 |
| 2014/0079978 A1* | 3/2014 | Al-Hallaj | ........... | H01M 10/5048 429/120 |
| 2014/0233184 A1* | 8/2014 | Thompson | ............ | H02J 7/025 361/692 |
| 2014/0340034 A1* | 11/2014 | Dietzel | ............... | B25H 3/022 320/108 |
| 2015/0022146 A1* | 1/2015 | Huber | ............... | B25H 3/006 320/108 |
| 2015/0037616 A1* | 2/2015 | Wyatt | ............... | H01M 10/625 429/7 |
| 2015/0037626 A1* | 2/2015 | Malcolm | ............. | H01M 2/206 429/53 |
| 2015/0037634 A1* | 2/2015 | Malcolm | ............. | H01M 10/482 429/90 |
| 2015/0037640 A1* | 2/2015 | Pinon | ............... | H01M 2/10 429/99 |
| 2015/0037641 A1* | 2/2015 | Pinon | ............... | H01M 2/1077 429/99 |
| 2015/0037642 A1* | 2/2015 | Pinon | ............... | H01M 2/1077 429/99 |
| 2015/0037646 A1* | 2/2015 | Wyatt | ............... | H01M 10/6551 429/120 |
| 2015/0037647 A1* | 2/2015 | Nguyen | ............... | H01M 10/625 429/120 |
| 2015/0037648 A1* | 2/2015 | Nguyen | ............... | H01M 10/625 429/120 |
| 2015/0037649 A1* | 2/2015 | Wyatt | ............... | H01M 10/625 429/120 |
| 2015/0037662 A1* | 2/2015 | Pinon | ............... | H01M 2/0237 429/179 |
| 2015/0073509 A1* | 3/2015 | Kallmyer | ............ | A61N 1/3787 607/61 |
| 2015/0188333 A1* | 7/2015 | Zhang | ............... | H01M 2/30 173/217 |
| 2015/0303531 A1* | 10/2015 | Willgert | ............. | H01M 2/105 429/50 |
| 2015/0318581 A1* | 11/2015 | Johnson | ............. | H01M 10/4257 429/7 |
| 2015/0364799 A1* | 12/2015 | Miller | ............... | H02J 5/005 320/108 |
| 2016/0351975 A1* | 12/2016 | Momo | ............... | H01M 10/0562 |
| 2017/0194810 A1* | 7/2017 | Cong | ............... | H02J 7/047 |

FOREIGN PATENT DOCUMENTS

| | | | | |
|---|---|---|---|---|
| CN | 1357591 A | 7/2002 | | |
| CN | 2588553 Y | 11/2003 | | |
| CN | 101423750 A | 5/2009 | | |
| CN | 101728597 A | 6/2010 | | |
| CN | 101947774 A | 1/2011 | | |
| CN | 102109227 A * | 6/2011 | | |
| DE | 3238333 A1 * | 4/1984 | ........ | F24D 11/0257 |
| DE | 4014243 A1 * | 11/1991 | ........ | F28D 20/02 |
| DE | 4230583 A1 * | 3/1994 | ........ | H01M 2/1094 |
| DE | 4307217 A1 * | 9/1994 | ........ | B60H 1/00492 |
| DE | 19525661 A1 * | 1/1997 | ........ | F01P 11/20 |
| DE | 10 2006 061270 | 6/2008 | | |
| DE | 10 2009 000392 | 7/2010 | | |
| EP | 0557544 A1 * | 9/1993 | ........ | A41D 13/0053 |
| EP | 0588004 A1 * | 3/1994 | ........ | H01M 2/1094 |
| JP | 2005151794 | 6/2005 | | |
| JP | 2006261009 | 9/2006 | | |
| JP | 3915635 B2 * | 5/2007 | | |
| JP | 2009303316 A * | 12/2009 | | |
| JP | 2010256761 | 11/2010 | | |
| JP | 5254670 B2 * | 8/2013 | | |
| WO | 2008/142223 A1 | 11/2008 | | |
| WO | WO 201217069 A2 * | 12/2012 | | |

OTHER PUBLICATIONS

"Heat Pipe Technology: Passive Heat Transfer for Greater Efficiency," Aavid Thermacore, published on google Jan. 12, 2010, Accessed Apr. 6, 2017, www.thermacore.com/thermal-basics/heat-pipe-technology.aspx.*

* cited by examiner

SYSTEM HAVING A HAND TOOL CASE, LATENT HEAT STORAGE UNIT, AND A HAND TOOL BATTERY PROVIDED FOR INDUCTIVE CHARGING

FIELD OF THE INVENTION

The present invention relates to a system having a hand tool battery, a hand tool case which has at least one inductive charge receiving area which is provided for storing a hand tool battery which is inserted into the inductive charge receiving area.

BACKGROUND INFORMATION

Certain systems having a hand tool case and a hand tool battery are believed to be generally understood.

SUMMARY OF THE INVENTION

The present invention relates to a system having a hand tool battery which may be provided for being inductively charged, having a hand tool case which has at least one inductive charge receiving area which is provided for storing a hand tool battery which is inserted into the inductive charge receiving area at least partially in close proximity to at least one wall of the hand tool case, and having at least one latent heat storage unit which is provided for influencing at least a temperature of the hand tool battery.

A "hand tool case" is understood in particular to mean a transport container which is provided for accommodating at least one hand tool battery and what may be at least one hand tool. In particular, the hand tool case has an at least essentially cuboidal shape. The statement that an object has an "essentially cuboidal" configuration is understood in particular to mean that there is at least one cuboid which is situated completely within the object and which encompasses at least 70%, in particular at least 80%, advantageously at least 90%, which may be at least 95%, of the points of the object. In particular, in at least one main direction of extension, the "height," the hand tool case has an extension which corresponds to 70% maximum, in particular 50% maximum, advantageously 30% maximum, which may be 10% maximum, of an extension along a further main direction of extension, the "width." A "main direction of extension" is understood in particular to mean a direction which is situated at least essentially in parallel to a main axis of inertia. Two main directions of extension may be situated perpendicularly with respect to one another. The hand tool case may have an extension, along the width, of at least 20 cm, in particular at least 25 cm, advantageously at least 35 cm, and 80 cm maximum, in particular 70 cm maximum, advantageously 50 cm maximum. The hand tool case may have an extension, along the height, of at least 5 cm, in particular at least 7 cm, advantageously at least 9 cm, and 20 cm maximum, in particular 15 cm maximum, advantageously 12 cm maximum.

In particular, the hand tool case has at least two housing parts which form an outer delimitation of the hand tool case. In particular, the housing parts are connected to one another via a hinge mechanism and/or a slide mechanism. In particular, at least one of the housing parts is configured as a shell, and, together with at least one interior structuring element which is situated in the housing part which is configured as a shell and/or is configured in one piece with the housing part, is provided for providing at least one inductive charge receiving area. In particular, at least one of the housing parts is configured as a lid. A "lid" is understood in particular to mean a housing part which is provided for closing the hand tool case. In particular, the lid is provided for preventing loading and/or unloading of the hand tool case, at least in the closed state. A "closed" state is understood in particular to mean a state in which the lid is connected to at least one further housing part, which may be different from a lid, immovably as far as possible, which may be in a form-locked manner and in particular via a detent mechanism. In particular, the housing parts are provided for sealing the hand tool case watertight. In particular, the hand tool case has at least one sealing element which is formed in particular by at least one rubber gasket and which is provided for being situated between the housing parts, which may be between abutting edges of the housing parts.

In addition, embodiments are conceivable in which, instead of a hand tool case, the system has a tool belt, in particular a tool holster, which is provided for transporting and/or holding at least one hand tool battery and/or at least one hand-held power tool with a coupled hand tool battery, and for allowing inductive charging of at least one hand tool battery.

In particular, on at least one lateral surface the hand tool case has a handle which in particular is provided for carrying and/or hanging the hand tool case in a vertical orientation in which the height of the hand tool case is oriented at least essentially in parallel to the horizontal. In particular, the hand tool case has at least one handle situated on a top side, in particular on the lid, and/or at least two handles which are situated on opposite lateral surfaces and which in particular are provided for carrying and/or hanging the hand tool case in a horizontal orientation in which the height of the hand tool case is oriented at least essentially perpendicularly with respect to the horizontal. The term "essentially parallel" is understood in particular to mean an angle of less than 30°, in particular less than 15°, advantageously less than 5°, which may be less than 1°. The term "essentially perpendicularly" is understood in particular to mean an angle which deviates from 90° by less than 30°, in particular by less than 15°, advantageously by less than 5°, which may be by less than 1°. In particular, the handles are pivotable and may be retractable into the hand tool case. A "lateral surface" is understood in particular to mean a surface which is oriented at least essentially in parallel to the height.

An "inductive charge receiving area" is understood in particular to mean a receiving area of the hand tool case which is provided for accommodating at least one hand tool battery and to assist in inductive charging of a hand tool battery which is inserted into the inductive charge receiving area. In particular, the inductive charge receiving area is provided for allowing charging of the hand tool battery with an efficiency of at least 70%, in particular at least 80%, advantageously at least 90%, which may be at least 95%. In particular, the inductive charge receiving area allows inductive charging of the hand tool battery through a wall of the hand tool case. In particular, the inductive charge receiving area has a configuration which corresponds to an inductive charge receiving area of a charging station configured as a hand tool case holding device. In particular, the inductive charge receiving area is provided for accommodating a hand tool battery which is mechanically connected to a hand tool and/or integrated into a hand tool. The housing parts, at least those situated in close proximity to the inductive charge receiving area, are made of an insulating material in order to avoid small losses during energy transmission via induction.

The term "provided" is understood in particular to mean specially configured and/or equipped. The statement that a hand tool battery is provided for being "inductively" charged is understood in particular to mean that the hand tool battery has at least one charging coil. In addition, the hand tool battery has at least one coupling site which is provided for mechanically connecting the hand tool battery to a hand tool. In particular, the coupling site is part of a detent mechanism and/or twist-on mechanism. A "charging coil" is understood in particular to mean a coil having at least one twisted, in particular wound, electrical conductor which is provided for sending and/or for receiving, in at least one operating state, energy for charging and/or discharging, in particular of at least one, which may be electrochemical, energy storage unit of the hand tool battery. The charging coil may be provided for converting an electrical alternating current into a magnetic alternating field and/or vice versa. In particular, the charging coil is provided for supplying received energy directly to a consumer, in particular via a voltage transformer. A system having a hand tool battery and a charging device and/or a hand tool may have at least two mutually coordinated charging coils which are spatially separable by an operator, in at least one operating state at least one charging coil being provided for generating a magnetic alternating field which induces an electrical alternating current in at least one additional charging coil.

In particular, the hand tool battery has an electronics system which is provided for converting an alternating current which is induced in the charging coil into a direct current which is storable in the energy storage unit, and/or for converting a direct current which is withdrawn from the energy storage unit into an alternating current in order to thus feed the charging coil and transmit energy to a corresponding charging coil. The statement that the hand tool battery is stored at least "partially in close proximity to" a wall is understood in particular to mean that at least 2% by volume, in particular at least 5% by volume, which may be at least 10% by volume, of the hand tool battery, and in particular at least 10% by volume, advantageously at least 30% by volume, which may be at least 50% by volume, of the charging coil, are situated at a distance of 25 mm maximum, in particular 20 mm maximum, advantageously 15 mm maximum, which may be 10 mm maximum, from the wall. A "wall" is understood in particular to mean an integral part of the hand tool case which is provided for forming an outer delimitation of the hand tool case. In particular, the wall has a material thickness of less than 8 mm, in particular less than 5 mm, advantageously less than 3 mm, which may be less than 2 mm. In particular, effective charging may be achieved.

In particular, a "hand tool" is understood to mean a tool which appears meaningful to those skilled in the art, advantageously a drill, a hammer drill, a percussion hammer, a saw, a plane, a screwdriver, a rotary cutter, a grinder, an angle grinder, a gardening implement, a building site measuring device, and/or a multifunctional tool, which may be provided for being operated in at least one operating state by a hand tool battery.

A "latent heat storage unit" is understood in particular to mean a unit having at least one latent heat storage element. A "latent heat storage element" is understood in particular to mean an element which contains at least one latent heat storage material and/or a latent heat storage material mixture which has at least one phase boundary, and when the phase boundary is exceeded, the latent heat storage material absorbs or emits a quantity of heat per unit mass which is at least 5 times, in particular at least 10 times, advantageously at least 20 times, which may be at least 40 times, larger than a quantity of heat which the same latent heat storage material absorbs when heated by 1 K beyond the phase boundary. In particular, the quantity of heat is at least 60 kJ/kg, in particular at least 100 kJ/kg, advantageously at least 130 kJ/kg, which may be at least 150 kJ/kg. A "phase boundary" is understood in particular to mean a limiting temperature, which generally is dependent on pressure. The limiting temperature of the at least one phase boundary of the at least one latent heat storage material, at least at a standard pressure of 1013 hPa, may be a temperature greater than −10° C., in particular greater than −5° C., advantageously greater than 0° C., which may be greater than 5° C. The limiting temperature of the at least one phase boundary, at least at standard pressure, may be less than 60° C., in particular less than 55° C., advantageously less than 50° C., which may be less than 45° C. The latent heat storage element may be provided for once again emitting or absorbing heat to the same extent by which it has been absorbed or emitted, respectively, for a reversed exceedance of the phase boundary. The phase boundary may be reversibly exceeded any arbitrary number of times. The latent heat storage unit may be provided for absorbing heat of at least 5 kJ, in particular at least 10 kJ, advantageously at least 20 kJ, which may be at least 30 kJ, when at least one phase boundary is exceeded.

In particular, a transition between a liquid state and a solid state takes place at the phase boundary. The at least one latent heat storage element may have an extension in at least one direction of at least 5 mm, in particular at least 10 mm, advantageously at least 20 mm, which may be at least 40 mm. An "extension" of an element in one direction is understood in particular to mean the longest distance which connects the two arbitrary points of the element and is situated in parallel to the direction. The latent heat storage unit advantageously contains at least 50 g, in particular at least 100 g, advantageously at least 200 g, in particular maximum 500 g, latent heat storage material. In particular, adequate temperature regulation may be achieved with what may be low additional weight.

In particular, a long service life of the hand tool battery may be achieved by the embodiment according to the present invention.

The latent heat storage unit advantageously has at least one latent heat storage element which is provided for at least temporarily avoiding overheating of the hand tool battery. "Overheating" of the hand tool battery is understood in particular to mean an exceedance of a critical temperature of at least one component of the hand tool. A "critical temperature of a component" is understood in particular to mean a temperature at which an irreversible change, i.e., a change which is not autonomously reversible, in particular destruction, of the component occurs. In particular, the critical temperature is determined by chemical and/or physical properties, for example a boiling temperature and/or a decomposition temperature, of at least one material, in particular an electrolyte, of the hand tool battery, in particular of the energy storage unit of the hand tool battery, which may be used for electrical energy transport and/or for electrical energy storage.

The statement that the latent heat storage element is provided "for avoiding" overheating is understood in particular to mean that at least one latent heat storage material of the latent heat storage element has at least one phase boundary with a limiting temperature greater than 30° C., in particular greater than 35° C., advantageously greater than 40° C., and less than 60° C., advantageously less than 55° C., which may be less than 50° C. The term "temporarily" is understood in particular to mean that the overheating may be avoided for a maximum period of time which is necessary for overcoming the phase boundary. The period of time is at least a function of a quantity of latent heat storage material in the latent heat storage unit, and a function of a level of a heat flow supplied to the hand tool battery, which in particular is determined by a charging current, a discharging current, and/or an ambient temperature, in particular an air temperature, outside the hand tool case, and a function of thermal insulation of the hand tool battery in the hand tool case. The latent heat storage unit may be configured to avoid overheating, starting from a temperature below the limiting temperature, for a period of at least one-half hour, in particular at least one hour, which may be at least two hours.

The latent heat storage unit thus in particular has sufficient quantities of suitable latent heat storage material in order to avoid overheating, in particular heating by a charging current and/or discharging current, under foreseeable conditions. In particular, the latent heat storage unit is provided for absorbing heat of at least 5 kJ, in particular at least 10 kJ, advantageously at least 20 kJ, which may be at least 30 kJ, in particular starting from a temperature of 30° C. up to a temperature of 50° C., in order to avoid overheating. In particular, the latent heat storage unit is provided for preventing overheating of the hand tool battery at an assumed ambient temperature of 70° C. for at least one hour, in particular at least one and one-half hours, advantageously at least two hours, which may be at least two and one-half hours. In particular, long durability of the hand tool battery may be achieved. In particular, charging of the hand tool battery when the hand tool case is closed is made possible, in particular it being possible to dispense with reducing a charging current in order to prevent overheating of the hand tool battery. In particular, a high level of self-discharge of the hand tool battery due to high temperatures may be avoided.

The latent heat storage unit may have at least one latent heat storage element which is provided for avoiding, at least temporarily, undercooling of the hand tool battery. "Undercooling" of the hand tool battery is understood in particular to mean a temperature which is below a threshold temperature of at least one integral part of the hand tool battery. The threshold temperature is determined in particular by a chemical and/or physical property, in particular a freezing temperature, which may be a lower limit of an electron mobility and/or ion mobility, of at least one material of the hand tool battery, in particular an electrolyte which may be utilized for electrical energy transport and/or for electrical energy storage. In particular, an electrolyte which is used in the energy storage unit below the threshold temperature has an ion mobility which is less than a value which is necessary to carry a charging current which allows complete charging of the hand tool battery in a period of eight hours maximum, in particular five hours maximum, which may be three hours maximum.

The statement that the latent heat storage element is provided for "avoiding undercooling" is understood in particular to mean that at least one latent heat storage material of the latent heat storage element has at least one phase boundary with a limiting temperature which is less than 30° C., in particular less than 20° C., advantageously less than 10° C., and greater than −10° C., advantageously greater than −5° C., which may be greater than 0° C. The term "temporarily" is understood in particular to mean that undercooling may be prevented for a maximum period of time which is necessary for overcoming the phase boundary. The period of time is at least a function of a quantity of latent heat storage material in the latent heat storage unit, a function of a magnitude of a heat flow supplied to the hand tool battery, which in particular is determined by an ambient temperature, in particular an air temperature, outside the hand tool case, and a function of thermal insulation of the hand tool battery in the hand tool case. The latent heat storage unit may be configured to avoid undercooling, starting from a temperature of the latent heat storage unit above the limiting temperature, for a period of at least two hours, in particular at least three hours, advantageously at least five hours, which may be at least eight hours. The latent heat storage unit thus in particular contains sufficient quantities of suitable latent heat storage material in order to avoid undercooling, in particular cooling due to low ambient temperatures such as during winter, in particular below 0° C., advantageously below 5° C., which may be below 10° C., under foreseeable conditions. In particular, the latent heat storage unit is provided for emitting heat of at least 10 kJ, in particular at least 20 kJ, advantageously at least 30 kJ, in particular starting from a temperature of 30° C., in order to avoid undercooling.

In particular, rapid and/or efficient charging of the hand tool battery may be achieved. In particular, damage of the hand tool battery may be avoided. In particular, long durability of the hand tool battery may be achieved. In particular, usability of the hand tool battery may be ensured, even when the hand tool case together with the hand tool battery is stored in a space which is at least essentially unheated and/or unheated at least overnight, in particular in a cargo area and/or trunk of a motor vehicle, in particular a passenger vehicle, in a garage, a storage space, or a repair shop, in particular during the winter and/or in areas having long-term low temperatures due to climate.

When the latent heat storage unit includes latent heat storage material which is provided for avoiding undercooling as well as latent heat storage material which is provided for avoiding overheating, the portion of latent heat storage material for avoiding overheating is advantageously greater than 40%, in particular greater than 50%, advantageously greater than 60%.

In addition, it is provided that the latent heat storage unit has at least one latent heat storage element situated in the hand tool battery. The statement that the latent heat storage element is situated "in the hand tool battery" is understood in particular to mean that the latent heat storage element in particular is connected in a form-locked manner to an energy storage unit of the hand tool battery, in particular at least via a third element. In particular, the latent heat storage element together with the energy storage unit is situated in a hand tool battery housing. Alternatively, the latent heat storage element is provided for forming at least a portion of the hand tool battery housing. In particular, efficient influencing of the temperature of the hand tool battery may be achieved. In particular, a low coefficient of heat transfer from the hand tool battery, in particular temperature-sensitive parts of the hand tool battery, in particular the energy storage unit, to the latent heat storage element may be achieved. The latent heat storage element situated in the hand tool battery may be provided for preventing overheating. In particular, overheating due to high discharge currents may be avoided or at least delayed. In particular, power throttling of a hand tool operated with the hand tool battery may be dispensed with at least for a long period of time, which may be completely.

In addition, it is provided that the latent heat storage unit has at least one latent heat storage element which is situated at least partially in close proximity at least partially around the at least one inductive charge receiving area. In particular, the latent heat storage element is provided for at least partially delimiting the inductive charge receiving area. The statement that the latent heat storage element is situated "at least partially in close proximity around the inductive charge receiving area" is understood in particular to mean that at least 30% by volume, in particular at least 50% by volume, advantageously at least 70% by volume, of the latent heat storage element is situated at a distance of 5 cm maximum, in particular 3 cm maximum, advantageously 2 cm maximum, from a hand tool battery which is inserted into the inductive charge receiving area, the latent heat storage element being different from a latent heat storage element which is situated in the hand tool battery. The latent heat storage element situated in close proximity around the inductive charge receiving area may be provided for avoiding overheating of the hand tool battery. In particular, efficient heat transfer between the hand tool battery and the latent heat storage unit may be achieved. In particular, a low weight of the hand tool battery compared to an embodiment mentioned above may be achieved.

In addition, it is provided that the latent heat storage unit has at least one latent heat storage element which is situated at least partially in close proximity to at least one wall of the hand tool case. In particular, at least 30%, in particular at least 50%, advantageously at least 70%, which may be at least 90%, of the latent heat storage element is situated at a distance of 5 cm maximum, in particular 3 cm maximum, advantageously 2 cm maximum, from the wall. At least in a closed state of the hand tool case, which may be at least 10%, in particular at least 20%, advantageously at least 30%, which may be at least 40%, of an overall solid angle about a midpoint, in particular a geometric center of gravity, of the inductive charge receiving area is enclosed by at least one latent heat storage element situated in close proximity to at least one wall of the hand tool case. The latent heat storage element situated in close proximity to a wall may be provided for avoiding undercooling of the hand tool battery. In particular, heat transfer through the wall may be reduced. Use may advantageously be made of previously unused areas of the hand tool case.

The at least one latent heat storage element may be provided for connection to at least one wall of the hand tool case. In particular, the latent heat storage element is connected to at least one wall of the hand tool case, in particular in an integrally joined manner, advantageously in a form-locked manner. The latent heat storage unit may have at least two latent heat storage elements, at least one of which is provided for storing the hand tool battery in a housing part which is configured in particular as a shell, and at least one other of which is provided for connection to a housing part of the hand tool case which is configured as a lid. The hand tool battery, at least in the closed state of the hand tool case, may be enclosed in both directions by at least one latent heat storage element in each case along the height.

The system advantageously has at least one insulating unit which at least partially encloses at least one latent heat storage element and/or at least the one hand tool battery. An "insulating unit" is understood in particular to mean a unit which has at least one insulating element. An "insulating element" is understood in particular to mean an element which is provided for impeding heat flow. In particular, an insulating element has a thermal transmission coefficient of 5 W/m$^2$K maximum, in particular 2 W/m$^2$K maximum, advantageously 1 W/m$^2$K maximum, particularly advantageously 0.3 W/m$^2$K maximum, which may be 0.1 W/m$^2$K maximum. A "thermal transmission coefficient" is understood in particular to mean a ratio of a heat flow to a product of an effective surface through which the heat flow enters and a temperature difference at which the heat flow occurs. An "effective surface" is understood in particular to mean a surface of a projection of the insulating element onto the walls of the hand tool case, starting from a midpoint of the inductive charge receiving area. A "temperature difference" is understood in particular to mean a difference of the ambient temperature from the temperature of the hand tool battery which is inserted into the inductive charge receiving area. The insulating element may be made, at least partially, of an air-containing material, in particular a foam. Alternatively, embodiments of the insulating element as a vacuum element are conceivable. An insulating element, which in particular is situated between the wall and the hand tool battery with the hand tool battery inserted, may be provided at least in one area of the wall, in the close proximity of which storage of the hand tool battery is provided. In particular, an influence of the ambient temperature on a temperature of an inserted hand tool battery may be reduced. In particular, a reduction in a quantity of required latent heat storage material for avoiding undercooling may be achieved.

In addition, it is provided that the at least one latent heat storage element which is provided for avoiding undercooling and the at least one latent heat storage element which is provided for avoiding overheating have a one-piece configuration. The term "one-piece" is understood in particular to mean at least connected in an integrally joined manner, for example by a welding process, a gluing process, an injection molding process, and/or some other process which appears meaningful to those skilled in the art, and/or advantageously formed in one piece, such as production from a casting and/or production in a single- or multi-component injection molding process, and advantageously from a single blank. At least two materials and/or material mixtures having at least one phase boundary in each case are present in a mixture, and form a material mixture having at least two phase boundaries. Alternatively, it is conceivable for the latent heat storage element to contain a single latent heat storage material having at least two suitably situated phase boundaries. In particular, a simple configuration may be achieved.

Furthermore, it is provided that the at least one latent heat storage element which is provided for avoiding undercooling at least partially encloses the at least one hand tool battery and/or the at least one latent heat storage element which is provided for avoiding overheating. Via a simple configuration, overheating of the hand tool battery due to heat emitted from the hand tool battery, caused, for example, by a charging current and/or discharging current, may be avoided, and undercooling due to external effects, such as a low ambient temperature, may be avoided.

It is advantageously provided that the latent heat storage unit has at least one latent heat storage element which is provided for absorbing or emitting heat from a melting process. A "melting process" is understood in particular to mean a process in which the phase of a material changes from solid to liquid, which may be without its chemical properties changing. In particular, a distinction is made between a melting process and a dissolution process. The latent heat storage material may be formed as a wax and/or wax mixture, in particular as a paraffin and/or paraffin wax. In particular, an easily controllable phase transition is achieved. In particular, good settability of one or multiple phase transition points may be achieved. In particular, good environmental compatibility may be achieved with materials which utilize a dissolution process for heat absorption.

Alternatively and/or additionally, at least one latent heat storage element of the latent heat storage unit may be provided for absorbing heat from a dissolution process. A "dissolution process" is understood in particular to mean a process in which a solid, which may be at least partially crystalline, substance is distributed in a liquid medium, in particular water, by breaking the bonds between atoms of the substance. In particular, the latent heat storage element contains at least one latent heat storage material which is formed from a hydrated salt, i.e., a salt having water bound in its crystal lattice.

In particular, the hydrated salt is provided for releasing the water which is bound in the crystal lattice when a certain limiting temperature which characterizes a phase boundary is exceeded, and for being dissolved itself in the water which is being released. Due to absorption of heat during the endothermic dissolution process, heating above the limiting temperature is avoided until at least essentially the entire latent heat storage material is dissolved. If the latent heat storage material cools to and/or below the limiting temperature, the process reverses, in particular assisted by crystal-forming agents which are added to the latent heat storage material, heat being released which prevents a further drop in the temperature until at least essentially the entire latent heat storage material has crystallized. The term "essentially" is understood to mean at least 80%, in particular at least 90%, advantageously at least 95%, which may be at least 99%. In particular, a high specific heat of transition may be achieved.

In addition, it is provided that the latent heat storage unit has a modular configuration. A "modular" configuration is understood in particular to mean a configuration in which, due to the combinability of different latent heat storage elements, increased flexibility with regard to variable parameters, for example at least one variable of the hand tool battery and/or climatic and/or seasonal conditions, may be provided.

In particular, the system has at least one second latent heat storage element which is provided for replacing a first latent heat storage element of the latent heat storage unit, the second latent heat storage element having a different temperature specification than the first latent heat storage element. A "temperature specification" is understood in particular to mean a combination of phase boundaries and/or different quantities of materials having different phase boundaries. In particular, the first latent heat storage element is provided for preventing undercooling of the hand tool battery, and the second latent heat storage element is provided for preventing overheating of the hand tool battery. Alternatively, the first latent heat storage element contains a large quantity of latent heat storage material which is provided for preventing undercooling, and the second latent heat storage element contains a large quantity of latent heat storage material which is provided for avoiding overheating. The statement that one latent heat storage element is provided for "replacing" another is understood in particular to mean that the latent heat storage elements are reversibly exchangeable with one another. They may have at least essentially the same shape.

In particular, adaptation to different climate- and/or season-related ambient temperatures may be achieved. Thus, for example, in summer a portion of latent heat storage material which is provided for avoiding overheating may be increased, while in winter, a portion of latent heat storage material which is provided for avoiding undercooling may be increased. In particular, a suitable selection of latent heat storage elements to be used may be made as a function of an ambient temperature to be expected.

In particular, the latent heat storage elements are characterized by different coloring as a function of their temperature specification.

The latent heat storage unit advantageously has at least one latent heat storage element which may be removed from the latent heat storage unit, and/or whose position in the latent heat storage unit is changeable. In particular, adaptability to different shapes and/or sizes of hand tool batteries, in particular hand tool batteries having different energy storage capacities, may be achieved.

In particular, the latent heat storage unit has at least three, in particular at least five, advantageously at least eight, which may be at least ten, latent heat storage elements. The latent heat storage elements may have a reversibly detachable connecting arrangement, in particular hook-and-loop connections, in order to fix a position of the latent heat storage elements. In particular, a high level of adaptability to climatic and/or seasonal conditions as well as to different shapes and/or sizes of the hand tool battery may be achieved.

Furthermore, it is provided that at least the three latent heat storage elements have at least essentially the same shape. The statement that at least two objects have "essentially the same shape" is understood in particular to mean that in each case at least two of the objects are congruent with one another, so that each of the objects encompasses at least 70%, in particular at least 80%, advantageously at least 90%, which may be at least 95%, of the points of the other object. In particular, the objects have the same size, in particular the same volume, and/or at least essentially the same side lengths and/or at least essentially the same angular relationships between sides. In particular, simple exchangeability may be achieved. Alternatively, increased adaptability to different shapes, in particular different sizes, of hand tool batteries may be achieved by use of differently shaped latent heat storage elements.

In addition, it is provided that the latent heat storage unit has at least one latent heat storage element which is formed from an enclosure which is filled with latent heat storage material. In particular, a simple configuration may be achieved. In particular, loose, in particular liquid and/or granular, latent heat storage materials may be securely stored. The enclosure has an at least partially flexible configuration, as the result of which in particular a high level of adaptability to shapes of a hand tool battery may be achieved. In particular, adaptability to thermal expansion of the latent heat storage material may be achieved by use of a flexible enclosure.

Furthermore, it is provided that the latent heat storage material is made of a granulate. A "granulate" is understood in particular to mean a quantity, in particular a pile, of macroscopic particles which may be identical. At least 60% by volume, in particular at least 70% by volume, advantageously at least 80% by volume, which may be at least 90% by volume, of the granulate contains particles having a maximum extension of at least 0.1 mm, in particular at least 0.3 mm, advantageously at least 1 mm, which may be at least 3 mm. In particular, at least 60% by volume, in particular at least 70% by volume, advantageously at least 80% by volume, which may be at least 90% by volume, of the granulate contains particles having an extension of 10 mm maximum, in particular 7 mm maximum, advantageously 5 mm maximum. The term "identical particles" is understood in particular to mean particles which are made of at least essentially the same material and/or have at least essentially the same shape and/or have at least essentially the same size. In particular, the granulate is provided for emitting or absorbing heat from an adsorption transition. In particular, the granulate is made of a porous material, in particular a silicate or a silicate matrix. In particular, the porous material is provided for accommodating latent heat storage material. In particular, pourability, formability and/or an inclusion may be maintained, regardless of a state of the latent heat storage material, in particular solid and/or liquid. In particular, a thermal expansion may be compensated for. In particular, the granulate is formed from small packets, sacs, and/or beads filled with latent heat storage material.

It is advantageously provided that the enclosure is made of an at least essentially watertight material. The statement that the enclosure has a "watertight" configuration is understood in particular to mean that under a pressure of at least 2 bar, in particular at least 5 bar, advantageously at least 10 bar, which may be at least 20 bar, water and/or water vapor in the amount of 100 mg/m$^2$h maximum, in particular 30 mg/m$^2$h maximum, advantageously 10 mg/m$^2$h maximum, which may be 3 mg/m$^2$h maximum, penetrates the enclosure. The enclosure may be made of at least one polymer, in particular at least one silicone and/or TPE and/or a thin-walled thermoplastic. In particular, reliable operation and/or long durability may be achieved. In particular, secure inclusion of liquids, in particular at least water-containing liquids, and/or gases, which in particular are part of the latent heat storage material, may be achieved.

Further advantages result from the following description of the drawings. Eight exemplary embodiments of the present invention are illustrated in the drawings. The drawings, the description, and the claims contain numerous features in combination. Those skilled in the art will also advantageously consider the features individually and combine them into further meaningful combinations.

DETAILED DESCRIPTION

Figure 1:
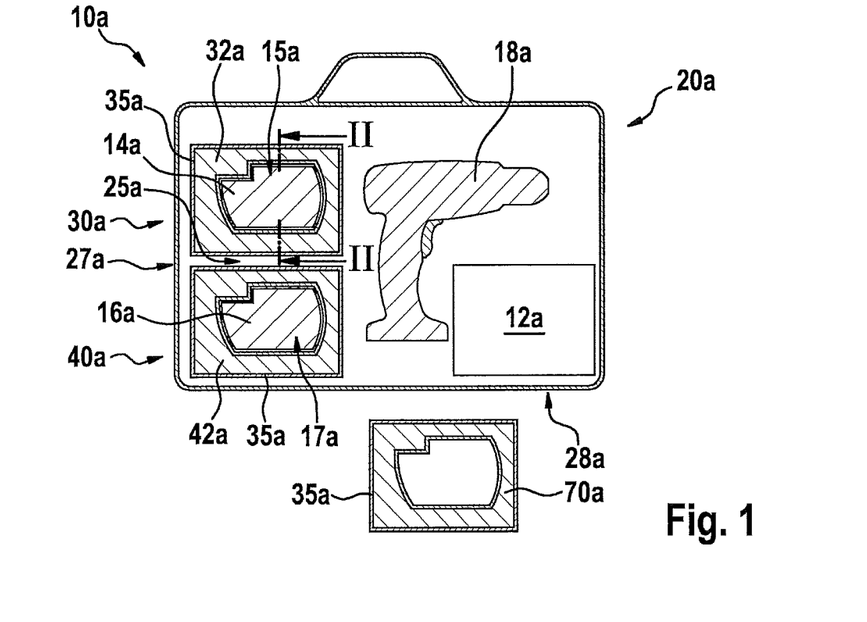
FIG. 1 shows a section of a system according to the present invention.
Figure 2:
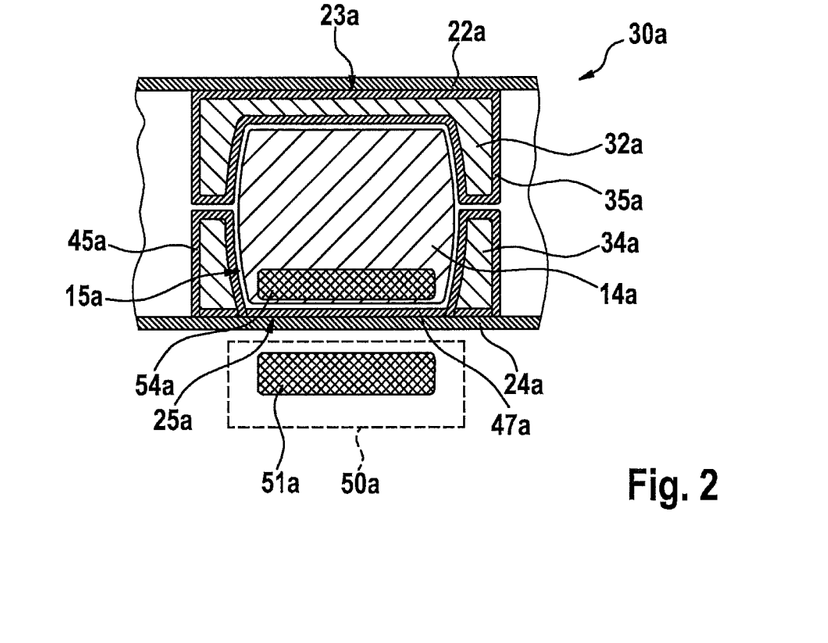
FIG. 2 shows a section along line II-II in FIG. 1.

FIG. 1 shows a schematic illustration of a system 10a having two hand tool batteries 14a, 16a. In addition, system 10a has a hand tool case 20a which includes two inductive charge receiving areas 15a, 17a which are each provided for storing a hand tool battery 14a, 16a, respectively, which is inserted into inductive charge receiving area 15a, 17a situated partially in close proximity to at least one wall 25a of hand tool case 20a (FIG. 2). In addition, system 10a has two latent heat storage units 30a, 40a which are provided for influencing temperatures of hand tool batteries 14a, 16a which are inserted into inductive charge receiving areas 15a, 17a. Furthermore, system 10a has a hand tool 18a. Hand tool case 20a is provided for allowing storage of hand tool 18a and transport of hand tool 18a.

Latent heat storage units 30a, 40a each have two latent heat storage elements 32a, 34a, 42a. Latent heat storage elements 32a, 34a, 42a are each situated in close proximity around one of inductive charge receiving areas 15a, 17a.

Latent heat storage elements 32a, 34a, 42a are partially situated in close proximity to walls 27a, 28a of hand tool case 20a. Walls 27a, 28a form outer sides of hand tool case 20a.

Latent heat storage elements 32a, 34a, 42a are provided for temporarily avoiding overheating of hand tool batteries 14a, 16a. Latent heat storage elements 32a, 34a of latent heat storage unit 30a have a combined mass of 300 g. Latent heat storage units 30a, 40a have a phase boundary at a temperature of 41° C. Latent heat storage elements 32a, 34a, 42a are provided for absorbing heat from a melting process. Latent heat storage units 30a, 40a are each provided for absorbing or emitting a heat quantity of 60 kJ via the phase boundary during a complete transition.

Latent heat storage units 30a, 40a have a modular configuration. System 10a has additional latent heat storage elements 70a (of which only one is illustrated as an example) which are provided for replacing latent heat storage elements 32a, 34a, 42a of latent heat storage units 30a, 40a, additional latent heat storage elements 70a having a different temperature specification than latent heat storage elements 32a, 34a, 42a. For this purpose, latent heat storage elements 32a, 34a, 42a may be removed from latent heat storage units 30a, 40a. Latent heat storage elements 70a are provided for preventing undercooling. Latent heat storage elements 70a have a limiting temperature of 5° C.

In alternative embodiments, a modular configuration of latent heat storage units 30a, 40a is dispensed with, and/or at least two, in particular all four, of latent heat storage elements 32a, 34a, 42a being provided for temporarily avoiding undercooling of hand tool battery 14a, 16a. In addition, it is conceivable for one of hand tool batteries 14a, 16a to be replaced by a suitably shaped additional latent heat storage element in order to ensure functionality even under extreme conditions, in particular particularly high or particularly low ambient temperatures.

Latent heat storage elements 32a, 34a, 42a are situated partially in close proximity to walls 23a, 25a of hand tool case 20a (FIG. 2). Hand tool case 20a is formed from two housing parts 22a, 24a. Walls 23a, 25a are part of housing part 22a, 24a, respectively. Housing part 22a is configured as a lid. Housing part 24a is configured as a base. Both housing parts 22a, 24a have a shell-shaped configuration. Latent heat storage elements 32a, 42a are connected to housing part 22a; i.e., they are also moved when hand tool case 20a is opened, and uncover hand tool batteries 14a, 16a. Latent heat storage elements 32a, 34a, 42a each enclose one-half the height of hand tool battery 14a, 16a. Latent heat storage elements 32a, 34a, 42a each form inductive charge receiving areas 15a, 17a, which are provided for accommodating hand tool batteries 14a, 16a, respectively.

In addition, system 10a has two insulating units 47a. Insulating units 47a are each formed from an individual insulating element. Insulating units 47a enclose each of hand tool batteries 14a, 16a on a bottom side. The insulating elements are made of a dimensionally stable foam having good thermal insulation.

Hand tool batteries 14a, 16a are provided for being inductively charged. Hand tool batteries 14a, 16a each have a charging coil 54a. Charging coil 54a is provided for receiving energy through wall 25a and insulating unit 47a from a corresponding charging coil 51a of a charging station 50a on which hand tool case 20a is placed. Charging coils 54a are each situated in parallel to wall 25a. Charging coils 54a are situated in close proximity to wall 25a.

Latent heat storage elements 32a, 34a, 42a, 70a are each formed from an enclosure 35a, 45a which is filled with latent heat storage material. Enclosures 35a, 45a are each made of a watertight material. Enclosures 35a, 45a are made of silicone. Latent heat storage elements 32a, 34a, 42a, 70a are each filled with paraffin waxes which are provided for melting at the particular limiting temperatures. The configuration of enclosures 35a, 45a made of flexible silicone allows expansion of latent heat storage elements 32a, 34a, 42a due to a change in volume of the paraffin waxes when the particular limiting temperature is exceeded. In addition, silicone allows sufficient stability for maintaining the shape of latent heat storage elements 32a, 34a, 42a, even in the liquid state.

In addition, configurations are conceivable in which the latent heat storage units are each formed from an individual latent heat storage element, which is provided for enclosing a complete height of hand tool battery 14a, 16a. In particular, in such a configuration an insulating unit has an additional insulating element which is provided for minimizing a heat flow through housing part 22a, which is configured as a lid.

Furthermore, hand tool case 20a has a receiving area 12a. Receiving area 12a may in particular be used for transporting a portable charging device for inductively charging hand tool batteries 14a, 16a. In addition, it is conceivable for receiving area 12a to be provided for accommodating latent heat storage elements 70a.

Seven further exemplary embodiments of the present invention are shown in FIGS. 3 through 10. The following descriptions and the drawings are limited essentially to the differences between the exemplary embodiments; with regard to components denoted in the same way, in particular components having the same reference numerals, reference may basically also be made to the drawings and/or the description of the other exemplary embodiments, in particular for FIGS. 1 and 2. To differentiate between the exemplary embodiments, the letter "a" is added as a suffix to the reference numerals of the exemplary embodiment in FIGS. 1 and 2. In the exemplary embodiments in FIGS. 3 through 10, the letter "a" is replaced by the letters "b" through "h," respectively.

Figure 3:
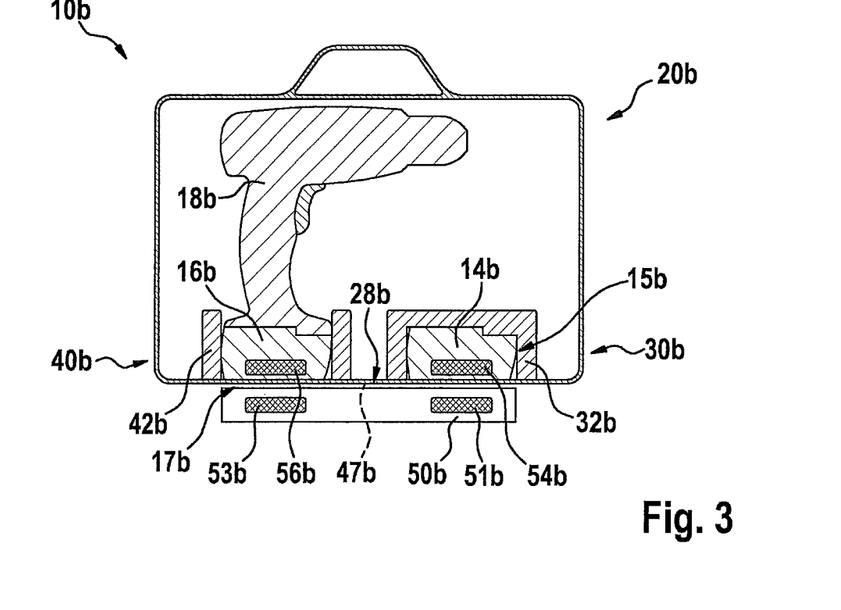
FIG. 3 shows an alternative system according to the present invention.

FIG. 3 shows a schematic illustration of a system 10b having two hand tool batteries 14b, 16b. In addition, system 10b has a hand tool case 20b which includes two inductive charge receiving areas 15b, 17b which are provided for storing the hand tool battery 14b, 16b which is inserted into inductive charge receiving areas 15b, 17b, respectively, partially in close proximity to a wall 28b of hand tool case 20b. In addition, system 10b has a hand tool 18b which is coupled to hand tool battery 16b. Wall 28b forms an outer side of hand tool case 20b. Wall 28b forms a side of hand tool case 20b which is situated opposite from a carrying handle which is provided for transporting hand tool case 20b in a vertical orientation. In addition, system 10b has two latent heat storage units 30b, 40b which are provided for influencing temperatures of hand tool batteries 14b, 16b.

Latent heat storage units 30b, 40b have latent heat storage elements 32b, 42b, respectively. Latent heat storage elements 32b, 42b are situated in close proximity to inductive charge receiving areas 15b, 17b, respectively. Latent heat storage elements 32b, 42b are provided for temporarily preventing overheating of hand tool batteries 14b, 16b, respectively. Alternatively, configurations are conceivable in which at least one of latent heat storage elements 32b, 42b is provided for at least temporarily preventing undercooling of hand tool batteries 14b, 16b. Latent heat storage elements 32b, 42b are partially situated in close proximity to wall 28b of hand tool case 20b.

Hand tool batteries 14b, 16b are provided for being inductively charged. Hand tool batteries 14b, 16b have a charging coil 54b, 56b, respectively, which is provided for receiving energy from a corresponding charging coil 51b, 53b of a charging station 50b on which hand tool case 20b is set or placed.

In another embodiment it may be provided that system 10b has an insulating unit 47b which at least partially encloses latent heat storage elements 32b, 42b and/or at least hand tool batteries 14b, 16b. For example, at least wall 28b could have a hollow configuration.

Figure 4:
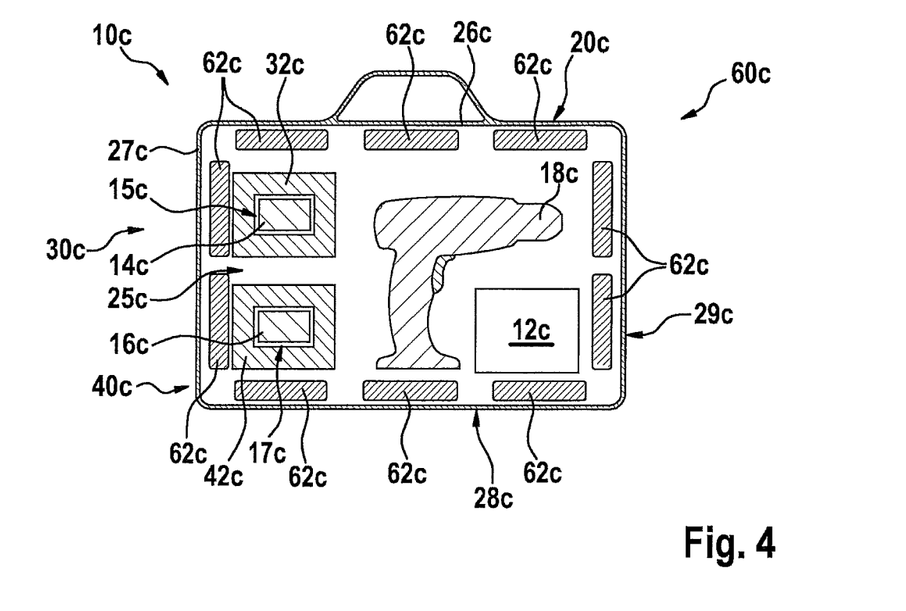
FIG. 4 shows another system according to the present invention.

FIG. 4 shows a schematic illustration of a system 10c having two hand tool batteries 14c, 16c. In addition, system 10c has a hand tool case 20c which includes two inductive charge receiving areas 15c, 17c which are provided for storing hand tool batteries 14c, 16c, respectively, which are inserted into inductive charge receiving areas 15c, 17c partially in close proximity to at least one wall 28c of hand tool case 20c. Wall 28c forms a bottom side of hand tool case 20c. In addition, system 10c has three latent heat storage units 30c, 40c, 60c which are provided for influencing temperatures of hand tool batteries 14c, 16c.

Latent heat storage units 30c, 40c have latent heat storage elements 32c, 42c, respectively. Latent heat storage elements 32c, 42c are situated in close proximity to inductive charge receiving areas 15c, 17c, respectively. Latent heat storage elements 32c, 42c are provided for temporarily avoiding overheating of hand tool batteries 14c, 16c.

Latent heat storage unit 60c has eight latent heat storage elements 62c. Latent heat storage elements 62c are situated in close proximity to walls 26c, 27c, 28c, 29c of hand tool case 20c. Walls 26c, 27c, 28c, 29c form outer sides of hand tool case 20c. Latent heat storage elements 62c have the same shape. Latent heat storage elements 62c are provided for temporarily avoiding undercooling of hand tool batteries 14c, 16c.

Latent heat storage elements 62c are provided for being removed from latent heat storage unit 60c and hand tool case 20c in order to achieve weight savings when ambient conditions make undercooling at least largely impossible. Alternatively, it may be provided for replacing latent heat storage elements 62c with latent heat storage elements which are provided for at least temporarily avoiding overheating in order to ensure longer functionality, or, at higher temperatures, reliable functionality.

In addition, it is conceivable for latent heat storage elements which are provided for preventing undercooling to also be situated at and/or in a top or bottom side of hand tool case 20c.

Figure 5:
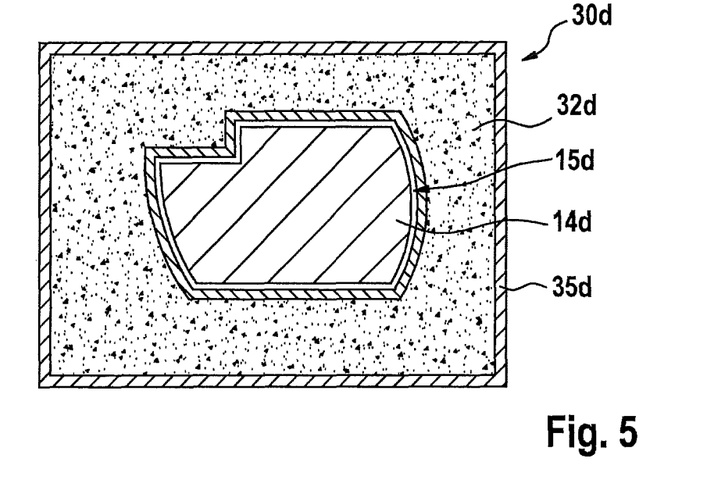
FIG. 5 shows an alternative embodiment of a latent heat storage unit.

FIG. 5 shows an alternative latent heat storage unit 30d, which could be used in a system similar to that in one of FIGS. 1 through 4, in a schematic sectional illustration. Latent heat storage unit 30d has a latent heat storage element 32d. Latent heat storage element 32d is situated in close proximity around an inductive charge receiving area 15d for a hand tool battery 14d. Latent heat storage element 32d is provided for temporarily avoiding overheating of hand tool battery 14d. Latent heat storage element 32d is provided for temporarily avoiding undercooling of hand tool battery 14d. Latent heat storage element 32d which is provided for avoiding undercooling and latent heat storage element 32d which is provided for avoiding overheating have a one-piece configuration. Latent heat storage element 32d is formed from an enclosure 35d which is filled with latent heat storage material. Enclosure 35d is made of a material which easily allows deformation. Enclosure 35d is made of a film made of a silicone. Alternatively, a configuration of the film as a thin-walled thermoplastic is conceivable. The latent heat storage material is made of a granulate. The granulate is formed from a porous silicate matrix, and has particle sizes similar to those of fine sand. The pores of a portion of the granulate are filled with paraffin having a limiting temperature of 3° C. Another portion of the granulate is filled with paraffin having a limiting temperature of 42° C. 70% of the granulate has a higher limiting temperature. The two portions of the granulate are homogeneously mixed. Good formability of latent heat storage element 32d and thus good adaptability to different shapes of different hand tool batteries may be achieved by the embodiment as a granulate having a flexible enclosure 35d. In addition, good thermal contact may be achieved due to the small distance between latent heat storage element 32d and hand tool battery 14d.

Furthermore, embodiments are conceivable in which an individual latent heat storage element contains only granulate having a high or a low limiting temperature. In addition, any arbitrary mixture ratios, in particular which are adapted to climatic conditions, are conceivable. In particular, a system may have three or more different, mutually exchangeable types of latent heat storage elements having different limiting temperatures. In particular, one of the types is provided for avoiding only undercooling, and in particular is provided for use during a cold time of year. In particular, at least one of the types is provided for avoiding overheating, and in particular is provided for use during a warm and/or hot time of year. At least one of the types may be provided for avoiding overheating as well as undercooling, and in particular is provided for use during a transitional period.

Figure 6:
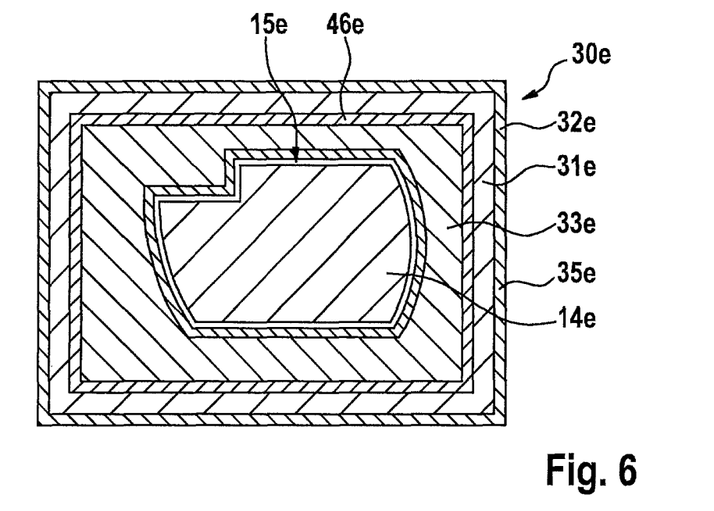
FIG. 6 shows another alternative embodiment of a latent heat storage unit.

FIG. 6 shows another alternative latent heat storage unit 30e, which could be used in a system similar to that in one of FIGS. 1 through 4, in a schematic sectional illustration. Latent heat storage unit 30e has a latent heat storage element 32e. Latent heat storage element 32e is situated in close proximity around an inductive charge receiving area 15e for a hand tool battery 14e. Latent heat storage element 32e is provided for temporarily avoiding overheating of hand tool battery 14e. Latent heat storage element 32e is provided for temporarily avoiding undercooling of hand tool battery 14e. Latent heat storage element 32e which is provided for avoiding undercooling and latent heat storage element 32e which is provided for avoiding overheating have a one-piece configuration. Latent heat storage element 32e is formed from an enclosure 35e which is filled with latent heat storage material. Latent heat storage element 32e is divided by a partition 46e into an inner latent heat storage area 33e and an outer latent heat storage area 31e. Inner latent heat storage area 33e is filled with a latent heat storage material which is provided for avoiding overheating of hand tool battery 14e. Outer latent heat storage area 31e is filled with a latent heat storage material which is provided for avoiding undercooling of hand tool battery 14e. Latent heat storage area 31e which is provided for avoiding undercooling encloses hand tool battery 14e and latent heat storage area 33e, which is provided for avoiding overheating.

In another embodiment, latent heat storage areas 31e, 33e are configured as separate latent heat storage elements which are separable from one another. The latent heat storage unit advantageously has a modular configuration, and the latent heat storage elements are provided for exchange with latent heat storage elements having a different temperature specification.

Figure 7:
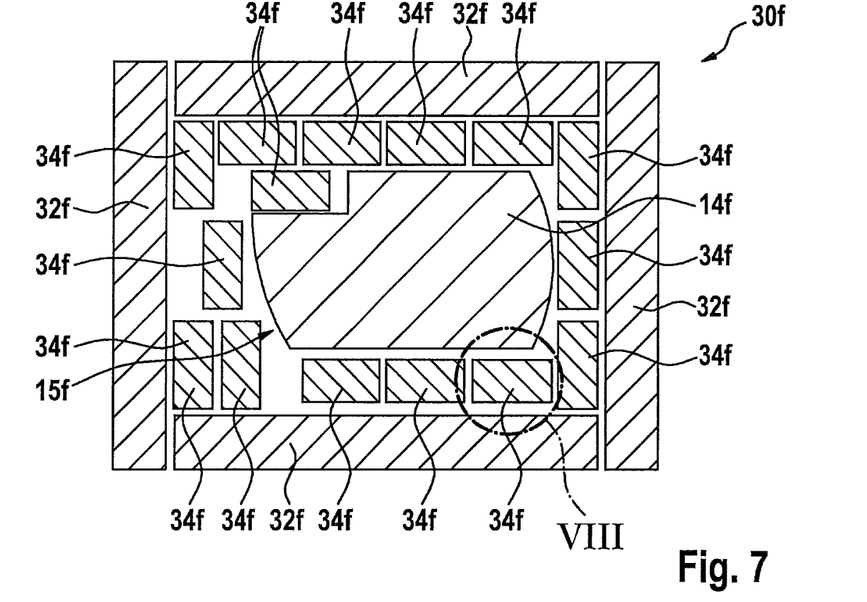
FIG. 7 shows a modular embodiment of a latent heat storage unit.

FIG. 7 shows another latent heat storage unit 30f, which could be used in a system similar to that in one of FIGS. 1 through 4, in a schematic sectional illustration. Latent heat storage unit 30f has a modular configuration. Latent heat storage unit 30f has latent heat storage elements 34f, of which fifteen are illustrated here. Latent heat storage elements 34f are situated in close proximity around an inductive charge receiving area 15f which is formed from latent heat storage elements 34f. Inductive charge receiving area 15f is provided for accommodating a hand tool battery 14f. Latent heat storage elements 34f are provided for temporarily avoiding overheating of hand tool battery 14f. Latent heat storage elements 34f have the same shape. Latent heat storage elements 34f have a cuboidal configuration. Latent heat storage elements 34f may be removed from latent heat storage unit 30f, and positions of latent heat storage elements 34f in latent heat storage unit 30f may be changed in order to adapt latent heat storage unit 30f to different hand tool batteries, in particular of different shapes and/or sizes.

In addition, latent heat storage unit 30f has latent heat storage elements 32f, of which four are illustrated here. Latent heat storage elements 32f are provided for avoiding undercooling of hand tool battery 14f. Latent heat storage elements 32f which are provided for avoiding undercooling partially enclose hand tool battery 14f and latent heat storage elements 34f which are provided for avoiding overheating. Latent heat storage elements 32f have the same shape. Latent heat storage elements 32f have an elongated cuboidal configuration. Latent heat storage elements 32f form a frame for latent heat storage unit 30f.

Figure 8:
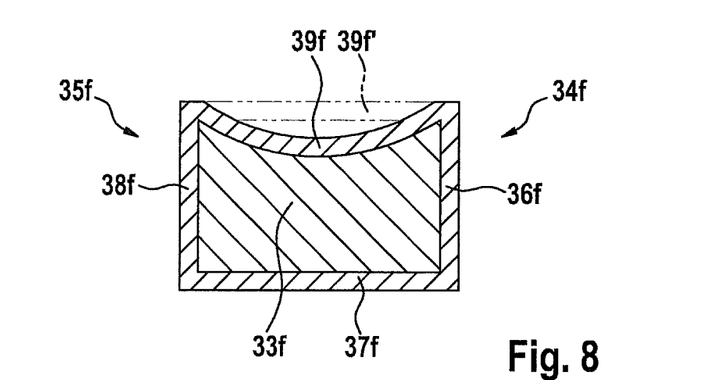
FIG. 8 shows a detailed illustration of region VIII from FIG. 7.

FIG. 8 shows one of latent heat storage elements 34f in a schematic sectional illustration. Latent heat storage element 34f is formed from an enclosure 35f which is filled with latent heat storage material. The latent heat storage material is provided for absorbing heat from a melting process. The enclosure forms a latent heat storage area 33f in which the latent heat storage material is accommodated. The latent heat storage material is a paraffin having a limiting temperature of 42° C., which determines a melting point. Enclosure 35f is made of a watertight material. One of enclosure walls 39f has a flexible configuration. The other enclosure walls 36f, 37f, 38f form a rigid box. The paraffin has a smaller volume in the solidified state than in the liquid state. Flexible enclosure wall 39f is convexly deformed in a solidified state of the paraffin. Flexible enclosure wall 39f assumes a flat shape due to expansion of the paraffin during melting.

Alternatively, it may be provided for only edges of enclosure 35f to have a rigid configuration and to span a cuboid, and for all enclosure walls 36f, 37f, 38f, 39f to have a flexible configuration.

Figure 9:
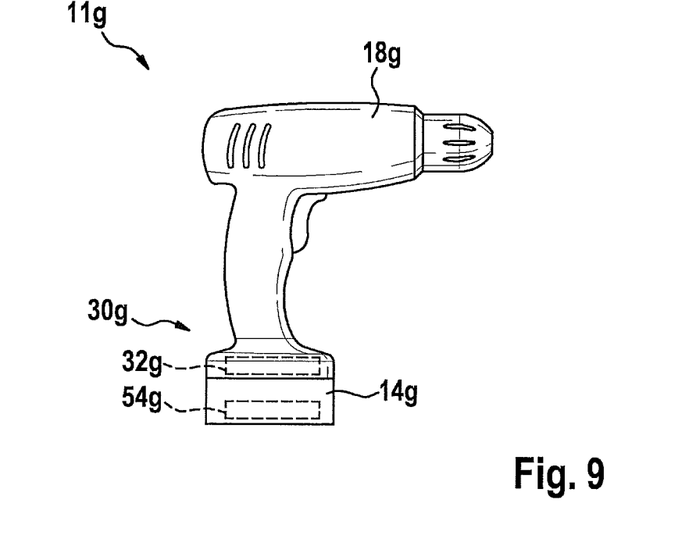
FIG. 9 shows another system according to the present invention with a latent heat storage unit integrated into a hand tool.

FIG. 9 shows a system 11g having a hand tool 18g and a hand tool battery 14g which is coupled to hand tool 18g. Hand tool battery 14g is provided for being inductively charged. Hand tool battery 14g has a charging coil 54g which is situated in close proximity to the bottom side of the hand tool battery and which is provided for receiving energy from a corresponding charging coil of a charging station. System 11*g* also has a latent heat storage unit 30*g* which is provided for influencing a temperature of hand tool battery 14*g*. Latent heat storage unit 30*g* has a latent heat storage element 32*g* which is provided for avoiding overheating of hand tool battery 14*g* during operation and during a charging operation in the coupled state. Latent heat storage element 32*g* is situated in hand tool 18*g*. Latent heat storage element 32*g* is situated in an area which is provided for coupling hand tool battery 14*g* to hand tool 18*g*.

Figure 10:
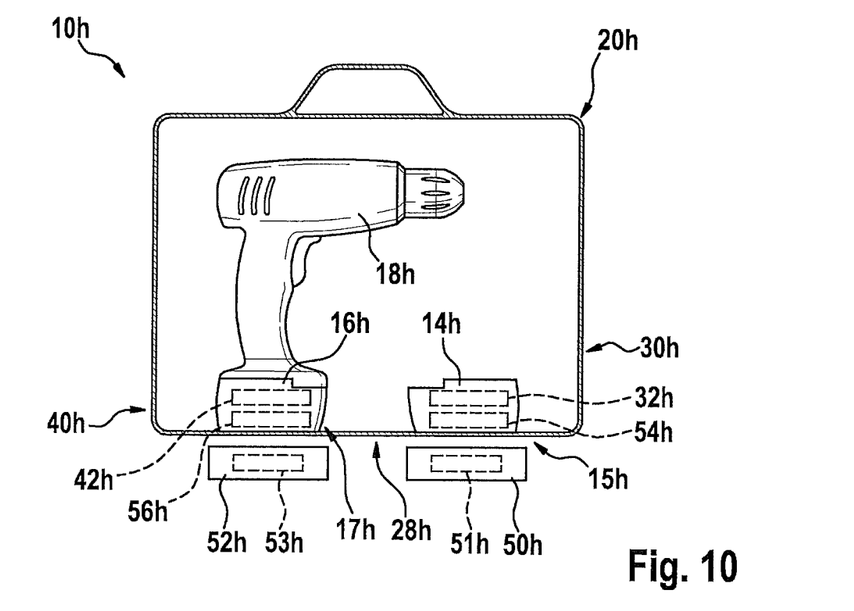
FIG. 10 shows a system according to the present invention with a latent heat storage unit integrated into a hand tool battery.

FIG. 10 shows another system 10*h* having two hand tool batteries 14*h*, 16*h*. System 10*h* also has a hand tool case 20*h* which includes two inductive charge receiving areas 15*h*, 17*h* which are provided for storing hand tool batteries 14*h*, 16*h*, respectively, which are inserted into inductive charge receiving areas 15*h*, 17*h* in close proximity to a wall 28*h* of hand tool case 20*h*. In addition, system 10*h* has two latent heat storage units 30*h*, 40*h* which are provided for influencing temperatures of hand tool batteries 14*h*, 16*h*, respectively. Latent heat storage units 30*h*, 40*h* have a latent heat storage element 32*h*, 42*h*, respectively. Latent heat storage elements 32*h*, 42*h* are situated in hand tool batteries 14*h*, 16*h*, respectively. Latent heat storage elements 32*h*, 42*h* are provided for temporarily avoiding overheating of hand tool battery 14*h*, 16*h*, respectively. System 10*h* includes a hand tool 18*h* which is coupled to hand tool battery 16*h*.

Hand tool batteries 14*h*, 16*h* are provided for being inductively charged. Hand tool batteries 14*h*, 16*h* have a charging coil 54*h*, 56*h*, respectively, which is provided for receiving energy from a corresponding charging coil 51*h*, 53*h* of a charging station 50*h* on which hand tool case 20*h* is set or on which hand tool case 20*h* is placed.

In addition, it is conceivable for latent heat storage units 30*h*, 40*h* to have additional latent heat storage elements, similarly to FIG. 3, which are situated in close proximity to inductive charge receiving areas 15*h*, 17*h*. These additional latent heat storage elements may be provided for temporarily avoiding undercooling of hand tool batteries 14*h*, 16*h*.

What is claimed is:

1. A system, comprising:
   a hand tool battery, wherein the hand tool battery is removable;
   a hand tool;
   a hand tool case which is adapted to store the hand tool and which includes a carrying handle provided for transporting the hand tool case and which has at least two inductive charge receiving areas that are separated from each other for storing the hand tool battery which is insertable into the inductive charge receiving areas at least partially in close proximity to at least one wall of the hand tool case; and
   at least one latent heat storage unit to influence at least a temperature of the hand tool battery,
   wherein the latent heat storage unit has at least one latent heat storage element that:
      is situated external to the hand tool battery;
      forms at least a portion of a housing of the hand tool battery and is permanently joined to at least a portion of the hand tool case; and
      is situated at least partially in close proximity at least partially around the at least two inductive charge receiving areas and which is configured to at least partially delimit the at least two inductive charge receiving areas.

2. The system of claim 1, wherein the latent heat storage unit has at least one latent heat storage element which is situated in the hand tool battery.

3. The system of claim 1, wherein the latent heat storage unit has at least one latent heat storage element to at least temporarily avoid undercooling of the hand tool battery.

4. The system of claim 1, wherein the latent heat storage unit has at least one latent heat storage element situated in close proximity to at least one wall of the hand tool case.

5. The system of claim 1, wherein the latent heat storage unit has at least one latent heat storage element to at least one of absorb and emit heat from a melting process.

6. The system of claim 1, wherein the latent heat storage unit has at least one latent heat storage element which is connected to at least one wall of the hand tool case.

7. The system of claim 1, wherein the hand tool case includes two housing parts embodied as a shell and a lid of the hand tool case, and the latent heat storage unit has at least two latent heat storage elements, wherein one of the at least two latent heat storage elements is connected to the shell and the other of the two latent heat storage elements is connected to the lid.

8. The system of claim 1, wherein the latent heat storage unit has at least two latent heat storage elements which form an inductive charge receiving area provided for accommodating the hand tool battery.

9. The system of claim 1, wherein at least 70% by volume of the latent heat storage element is situated at a maximum distance of 5 cm from the hand tool battery.

10. The system of claim 1, wherein at least 70% by volume of the latent heat storage element is situated at a maximum distance of 5 cm from the at least one wall of the hand tool case.

11. The system of claim 1, wherein the at least one latent heat storage element is provided for at least temporarily avoiding overheating of the hand tool battery.

12. The system of claim 11, further comprising:
    at least one insulating unit at least partially enclosing at least one of the latent heat storage element and the at least the one hand tool battery.

13. The system of claim 1, wherein the at least one latent heat storage unit includes at least one latent heat storage element configured to avoid undercooling and which is configured in one piece with at least one latent heat storage element which is configured to avoid overheating have a one-piece configuration.

14. The system of claim 13, wherein the at least one latent heat storage element configured to avoid undercooling at least partially encloses at least one of the hand tool battery and the at least one latent heat storage element configured to avoid overheating.

15. The system of claim 1, wherein the latent heat storage unit has at least one latent heat storage element which is formed from an enclosure which is filled with latent heat storage material.

16. The system of claim 15, wherein the latent heat storage material of the latent heat storage element is made of a granulate.

17. The system of claim 15, wherein the enclosure of the latent heat storage element is made of an at least essentially watertight material.

18. The system of claim 1, wherein the latent heat storage unit has a modular configuration.

19. The system of claim 18, further comprising:
    a second latent heat storage element for replacing a first latent heat storage element of the latent heat storage unit, the second latent heat storage element having a different temperature specification than the first latent heat storage element.

20. The system of claim 18, wherein the latent heat storage unit has at least one latent heat storage element satisfies at least one of: (i) is removable from the latent heat storage unit, and (ii) whose position in the latent heat storage unit is changeable.

21. The system of claim 18, wherein the latent heat storage unit has at least three latent heat storage elements.

22. The system of claim 21, wherein at least the three latent heat storage elements have at least essentially the same shape.

23. A hand tool case of a system, comprising:
a hand tool case arrangement which is adapted to store the hand tool and which includes a carrying handle provided for transporting the hand tool case which has at least two inductive charge receiving areas that are separated from each other for storing a hand tool battery which is insertable into the inductive charge receiving area at least partially in close proximity to at least one wall of the hand tool case arrangement; and
wherein the hand tool case arrangement is for use with the system, which includes the hand tool battery and at least one latent heat storage unit to influence at least a temperature of the hand tool battery,
wherein the latent heat storage unit has at least one latent heat storage element that:
is situated external to the hand tool battery;
forms at least a portion of a housing of the hand tool battery and is permanently joined to at least a portion of the hand tool case; and
is configured to at least partially delimit the inductive charge receiving areas.

24. A hand tool battery of a system, comprising:
a hand tool battery arrangement for use with the system;
wherein the system includes a hand tool case which is adapted to store the hand tool and which includes a carrying handle provided for transporting the hand tool case which has at least two inductive charge receiving areas that are separated from each other for storing the hand tool battery arrangement which is insertable into the inductive charge receiving area at least partially in close proximity to at least one wall of the hand tool case, and
wherein the system includes at least one latent heat storage unit to influence at least a temperature of the hand tool battery,
wherein the latent heat storage unit has at least one latent heat storage element that:
is situated external to the hand tool battery;
forms at least a portion of a housing of the hand tool battery and is permanently joined to at least a portion of the hand tool case; and
is configured to at least partially delimit the inductive charge receiving areas.

25. A latent heat storage element of a system, comprising:
a latent heat storage element arrangement to influence at least a temperature of at least one hand tool battery for use with a system;
wherein the system includes the at least one hand tool battery and a hand tool case which is adapted to store the hand tool and which includes a carrying handle provided for transporting the hand tool case which has at least two inductive charge receiving areas that are separated from each other for storing the at least one hand tool battery which is insertable into the inductive charge receiving area at least partially in close proximity to at least one wall of the hand tool case,
wherein the at least one latent heat storage element:
is situated external to the hand tool battery;
forms at least a portion of a housing of the hand tool battery and is permanently joined to at least a portion of the hand tool case; and
is configured to at least partially delimit the inductive charge receiving areas.

26. The latent heat storage element of a system of claim 25,
wherein the latent heat storage arrangement has at least one latent heat storage element which is situated in the at least one hand tool battery.

* * * * *